US008979208B2

(12) United States Patent
Roach et al.

(10) Patent No.: US 8,979,208 B2
(45) Date of Patent: Mar. 17, 2015

(54) TRANSMISSION AND HOIST CONTROL ARRANGEMENT (71) Applicant: Caterpillar Inc., Peoria, IL (US)

(72) Inventors: Keegan W. Roach, Peoria, IL (US); Bryan E. Copeland, Bartonville, IL (US); Todd B. Smith, Peoria, IL (US); Robert T. Cameron, Ellisville, IL (US); Robert E. Riedel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/736,336

(22) Filed: Jan. 8, 2013

(65) Prior Publication Data

US 2014/0191559 A1   Jul. 10, 2014

(51) Int. Cl.
B60P 1/04 (2006.01)
F16H 59/04 (2006.01)
B60K 20/08 (2006.01)

(52) U.S. Cl.
CPC .............. F16H 59/044 (2013.01); B60K 20/08 (2013.01); B60P 1/04 (2013.01); B60Y 2200/142 (2013.01)
USPC ....................................................... 298/22 C (58) Field of Classification Search
CPC .................................. B62D 1/12; B60K 26/00
USPC .......................................... 298/22 C; 180/333
See application file for complete search history.

(56) References Cited

U.S. PATENT DOCUMENTS

| 4,645,030 | A | * | 2/1987 | von Bernuth et al. | 180/333 |
|---|---|---|---|---|---|
| 4,777,333 | A | * | 10/1988 | Valenzona | 200/433 |
| 5,365,803 | A | | 11/1994 | Kelley et al. | |
| 5,704,429 | A | * | 1/1998 | Lee et al. | 172/4.5 |
| H0001831 | H | * | 2/2000 | Kelley et al. | 180/333 |
| 6,081,763 | A | * | 6/2000 | Smith et al. | 701/93 |
| 6,542,789 | B2 | * | 4/2003 | Ufheil | 700/275 |
| 6,550,562 | B2 | * | 4/2003 | Brandt et al. | 180/333 |
| 6,571,902 | B2 | * | 6/2003 | Heyne et al. | 180/321 |
| 6,644,141 | B2 | * | 11/2003 | Oikarinen | 74/471 XY |
| 6,675,508 | B2 | * | 1/2004 | Tamaru et al. | 37/348 |
| 6,833,521 | B2 | * | 12/2004 | Nishikawa | 200/339 |
| 6,903,288 | B2 | * | 6/2005 | Varga | 200/200 |
| 6,914,201 | B2 | * | 7/2005 | Van Vooren et al. | 200/1 B |
| 6,932,113 | B1 | * | 8/2005 | Kauss | 137/636.2 |
| 7,293,625 | B2 | * | 11/2007 | Kumazawa | 180/333 |
| 7,334,658 | B2 | * | 2/2008 | Berg et al. | 180/333 |
| 7,497,298 | B2 | * | 3/2009 | Shearer et al. | 180/333 |
| 7,681,686 | B1 | * | 3/2010 | Klas et al. | 180/331 |
| 7,729,835 | B2 | * | 6/2010 | Morris et al. | 701/50 |
| 8,033,614 | B2 | * | 10/2011 | Nabeshima et al. | 298/22 C |

(Continued)

FOREIGN PATENT DOCUMENTS

| JP | 08113049 | 5/1996 |
|---|---|---|
| JP | 08132903 | 5/1996 |
| JP | 2000071801 | 3/2000 |

OTHER PUBLICATIONS

Merriam Webster's Online Dictionary definition of "detent", May 19, 2014.*

Primary Examiner — H Gutman (74) Attorney, Agent, or Firm — M. Daniel Spillman (57) ABSTRACT An input device for a machine is provided. The input device includes a lever which is operable to select from a plurality of transmission modes of the machine. Further, a hoisting input device is disposed on the lever. The hoisting input device is operable to select from a plurality of hoisting functions associated with a payload carrier of the machine.

3 Claims, 7 Drawing Sheets (56) References Cited

U.S. PATENT DOCUMENTS

| | | |
|---|---|---|
| 8,212,770 B2 | 7/2012 | Obourn et al. |
| 8,380,402 B2 * | 2/2013 | Hobenshield .................. 701/50 |
| 8,437,920 B2 * | 5/2013 | Hobenshield et al. .......... 701/50 |
| 2002/0074181 A1 * | 6/2002 | Brandt et al. ................. 180/315 |
| 2002/0166267 A1 * | 11/2002 | McGugan ....................... 37/348 |
| 2002/0178624 A1 * | 12/2002 | Yamamoto et al. ............. 37/348 |
| 2009/0164065 A1 * | 6/2009 | Daniels et al. ................. 701/41 |

* cited by examiner

TRANSMISSION AND HOIST CONTROL ARRANGEMENT

TECHNICAL FIELD

The present disclosure relates to a transmission and hoist control arrangement for a machine. In a specific embodiment, the present disclosure relates to an input device for controlling a transmission of the machine and hoisting functions associated with a payload carrier of the machine.

BACKGROUND

Machines having a payload carrier include input devices to control transmission of the machine and hoisting functions associated with movement of the payload carrier. Operators of such machines may sometimes need to control both the transmission and hoisting functions concurrently, for example, during a dump cycle of the machine.

Conventionally, separate input devices are used to independently control the transmission and the hoisting functions of the machine. A first input device may allow the operator to set transmission settings and gear transmission settings for the machine. A second input device may allow the operator to control a plurality of actuators in order to raise, lower, hold or float the payload carrier of the machine.

However, such separate input devices are expensive and may require additional space within an operator station of the machine. Moreover, operating separate input devices to simultaneously control the transmission and hoisting functions may require the operator to constantly switch hands between the separate controls. This may result in difficulty of operation of the separate input devices. Input devices having multiple functionalities have recently come into use. However, such devices do not offer the feature of simultaneous control over the transmission and the hoisting functions of the machine.

Therefore, there is a need for an improved input device to overcome the above mentioned shortcomings.

SUMMARY OF THE DISCLOSURE

In one aspect of the present disclosure, an input device for a machine is provided. The input device includes a lever which is operable to select from a plurality of transmission modes of the machine. Further, a hoisting input device is disposed on the lever. The hoisting input device is operable to select from a plurality of hoisting functions associated with a payload carrier of the machine.

In another aspect, an input device for a machine is provided. The input device includes a lever which is operable to select from a plurality of hoisting functions associated with a payload carrier of the machine. Further, a transmission input device is disposed on the lever. The transmission input device is operable to select from a plurality of transmission modes of the machine.

In yet another aspect, a machine is provided. The machine has a frame and a payload carrier pivotally attached to the frame. An actuator is coupled between the frame and the payload carrier. The actuator is configured to raise and lower the payload carrier relative to the frame. The machine also includes a lever and an input device disposed on the lever. One of the lever and the input device is operable to select from a plurality of transmission modes of the machine. The other of the lever and the input device is operable to select from a plurality of hoisting functions associated with movement of the actuator to raise and lower the payload carrier relative to the frame of the machine.

Other features and aspects of this disclosure will be apparent from the following description and the accompanying drawings.

DETAILED DESCRIPTION

Figure 1:
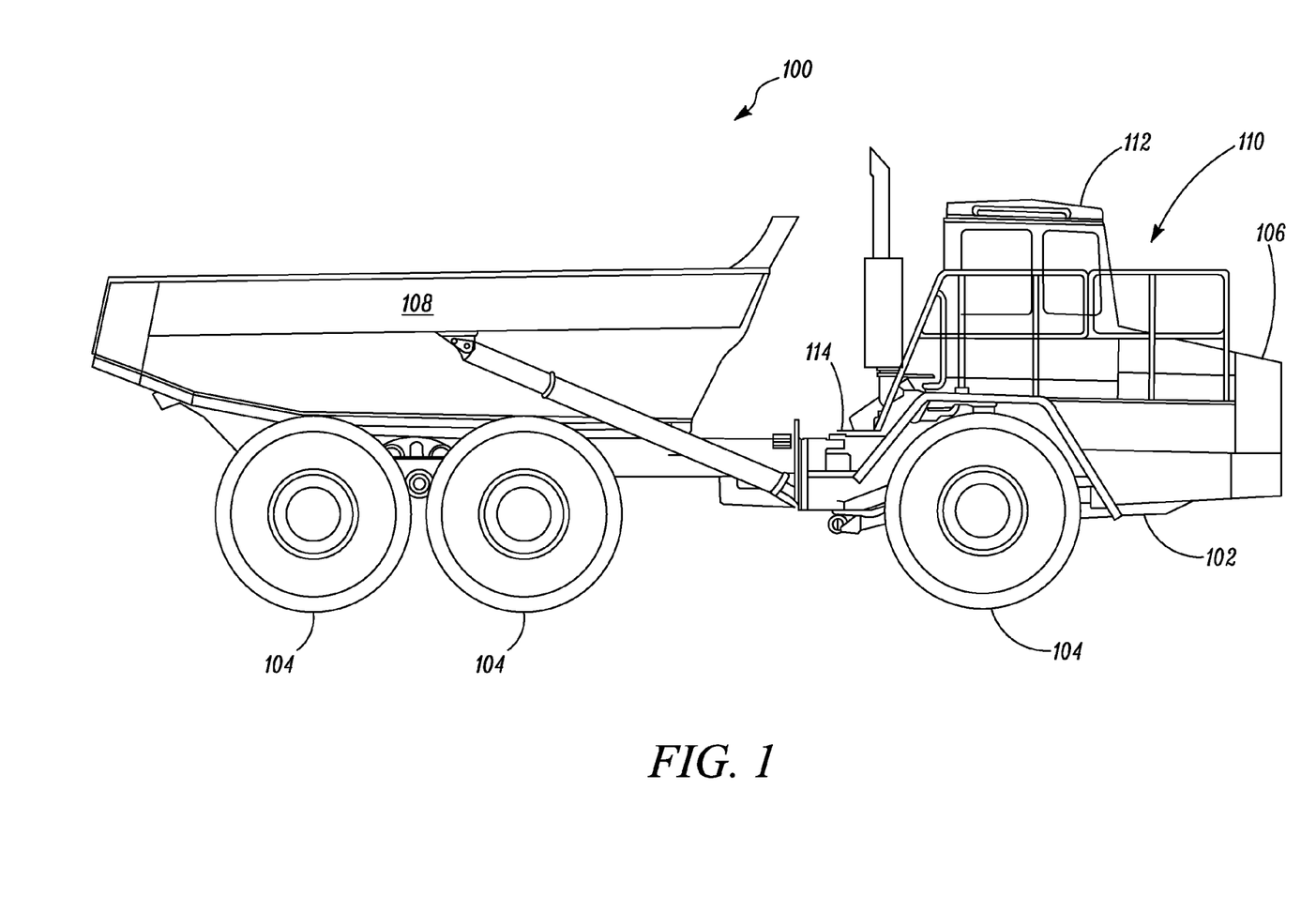
FIG. 1 is a side view of an exemplary machine, according to an embodiment of the present disclosure.

FIG. 1 illustrates an exemplary machine 100. In one embodiment, the machine 100 may embody an articulated truck. As illustrated in FIG. 1, the machine 100 may be a wheeled machine and includes a frame 102, wheels 104, an engine compartment 106, and a payload carrier 108. The machine 100 may further include an engine positioned in the engine compartment 106 and supported on the frame 102. The engine may be an internal combustion engine, for example, a petrol engine, a diesel engine, or a gas powered engine.

In the illustrated embodiment, a cab 112 is mounted on a front end 110 of the frame 102 of the machine 100. The cab 112 may be disposed above the engine and extend rearward beyond the engine. In some embodiments, the cab 112 may enclose the engine by forming a portion of the engine compartment 106. In other embodiments, the cab 112 may be pivotally mounted to the frame 102, such that the cab 112 may be tilted to provide an access to the engine.

During operation of the machine 100, the payload carrier 108 of the machine 100 may be raised or lowered with respect to the frame 102 of the machine 100 by means of an actuator 114. The actuator 114 is coupled between the frame 102 and the payload carrier 108. The present disclosure relates to an input device 202 for controlling a transmission of the machine 100 and hoisting of the payload carrier 108 relative to the frame 102 of the machine 100.

Figure 2:
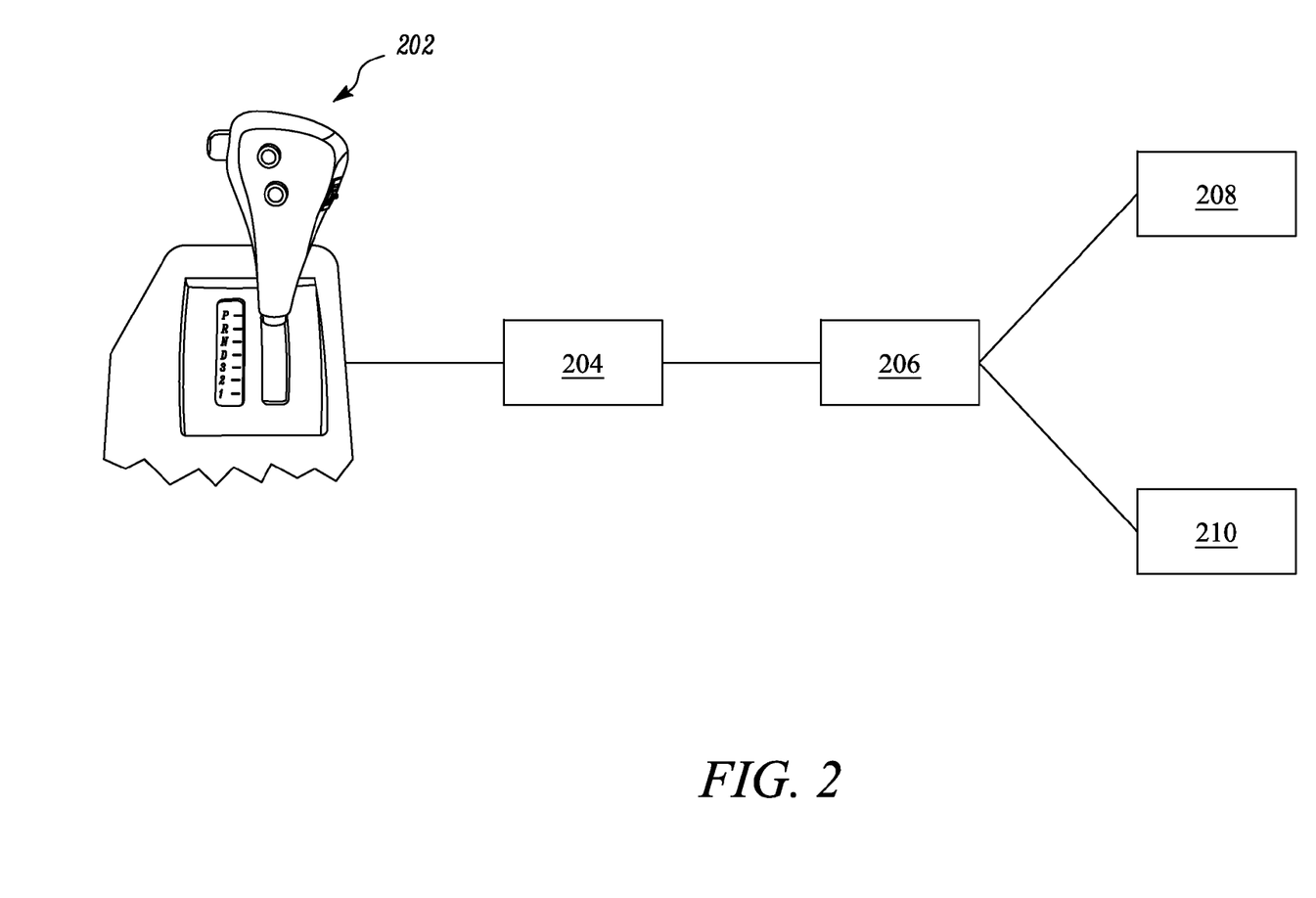
FIG. 2 is an exemplary block diagram of functional components of the machine for transmission and hoist control.

Referring to FIG. 2, in one embodiment, the input device 202 may be placed in the cab 112. The input device 202 may further be communicably coupled to an engine control unit (ECU) 204 of the machine 100. Based on an input received from the operator, the input device 202 may send control signals to the ECU 204, indicative of an operator command for transmission control and/or hoisting control of the machine 100. A person of ordinary skill in the art will appreciate that the ECU 204 may control a variety of functions on the machine 100. For the purpose of this disclosure, we will consider the transmission control of the machine 100 and the hoisting control for the payload carrier 108 of the machine 100.

As shown, the ECU 204 may be coupled to a hydraulics control system 206 of the machine 100. The hydraulics control system 206 is configured to receive inputs from the ECU 204 for controlling a transmission control 208 and/or a hoist control 210 of the machine 100. Hence, the hydraulics control system 206 may effectuate movement of the payload carrier 108 relative to the frame 102 of the machine 100 and/or control the transmission of the machine 100, based on control signals received from the ECU 204.

The transmission control 208 is configured to set a transmission mode of the machine 100, and perform other related operations such as, shift a gear for a selected transmission mode to control a speed of the machine 100, hold the gear for a desired transmission mode of the machine 100, and the like. In one embodiment, the transmission mode of the machine 100 may include at least one of a park, reverse, neutral and drive mode. The hoisting control 210 is configured to effectuate hoisting of the payload carrier 108 based on inputs provided by the operator via the input device 202. In another embodiment, the hoisting functions associated with the payload carrier 108 of the machine 100 may include any one of the lower, hoist, float and raise functions.

The present disclosure relates to the input device 202 including a lever and an additional input device disposed on the lever. Any one of the lever and the additional input device is operable to select from the plurality of the transmission modes of the machine 100, while the other is operable to select from the plurality of hoisting functions associated with the payload carrier 108 of the machine 100. The additional input device disposed on the lever may include for example, a rocker switch, a rotary switch, push buttons, and the like. Hence, with the use of a single input device 202, the operator may simultaneously select the transmission mode and the hoisting function of the machine 100 with ease.

Figure 3:
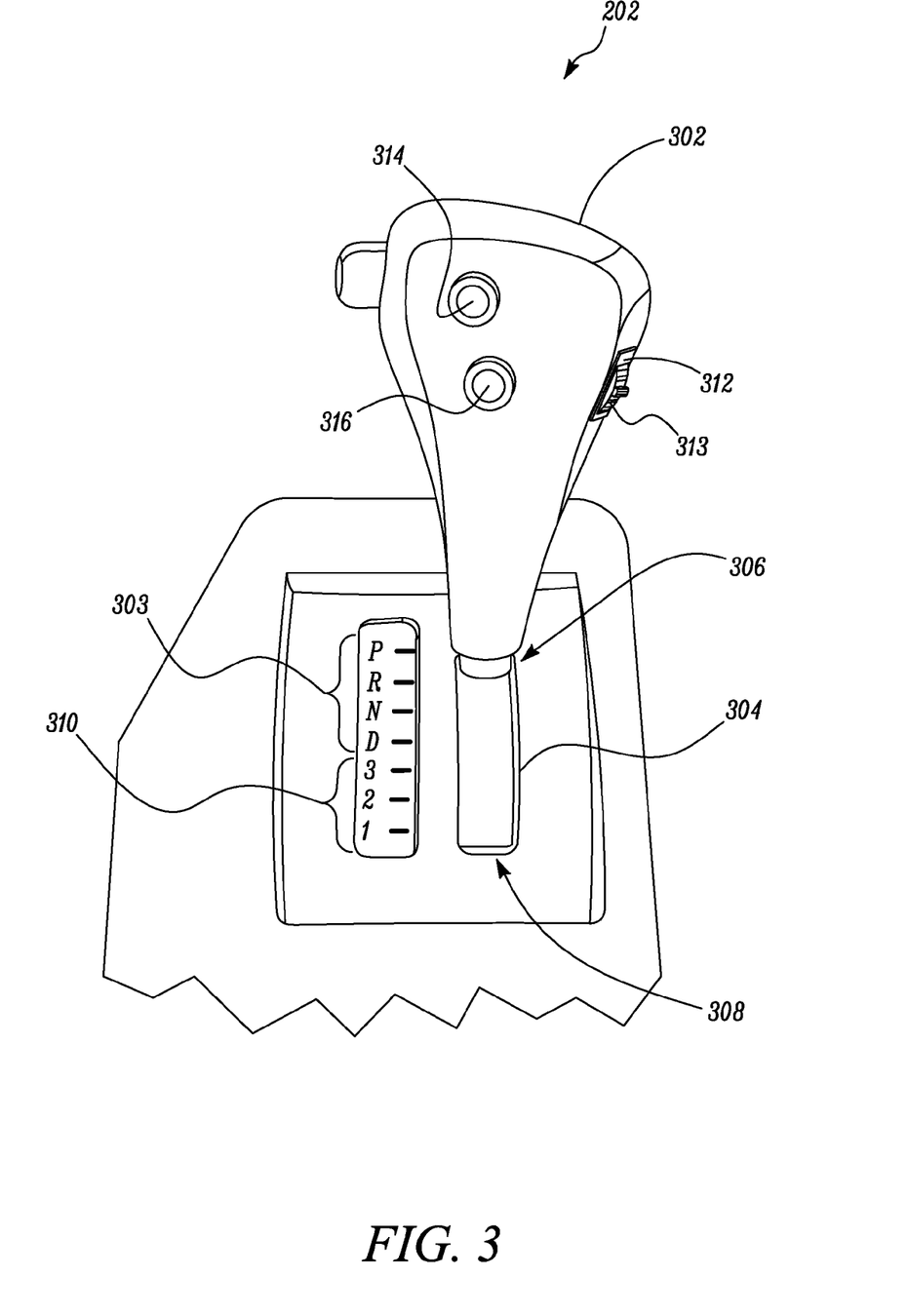
FIG. 3 is a front view of an exemplary input device for the machine.
Figure 4:
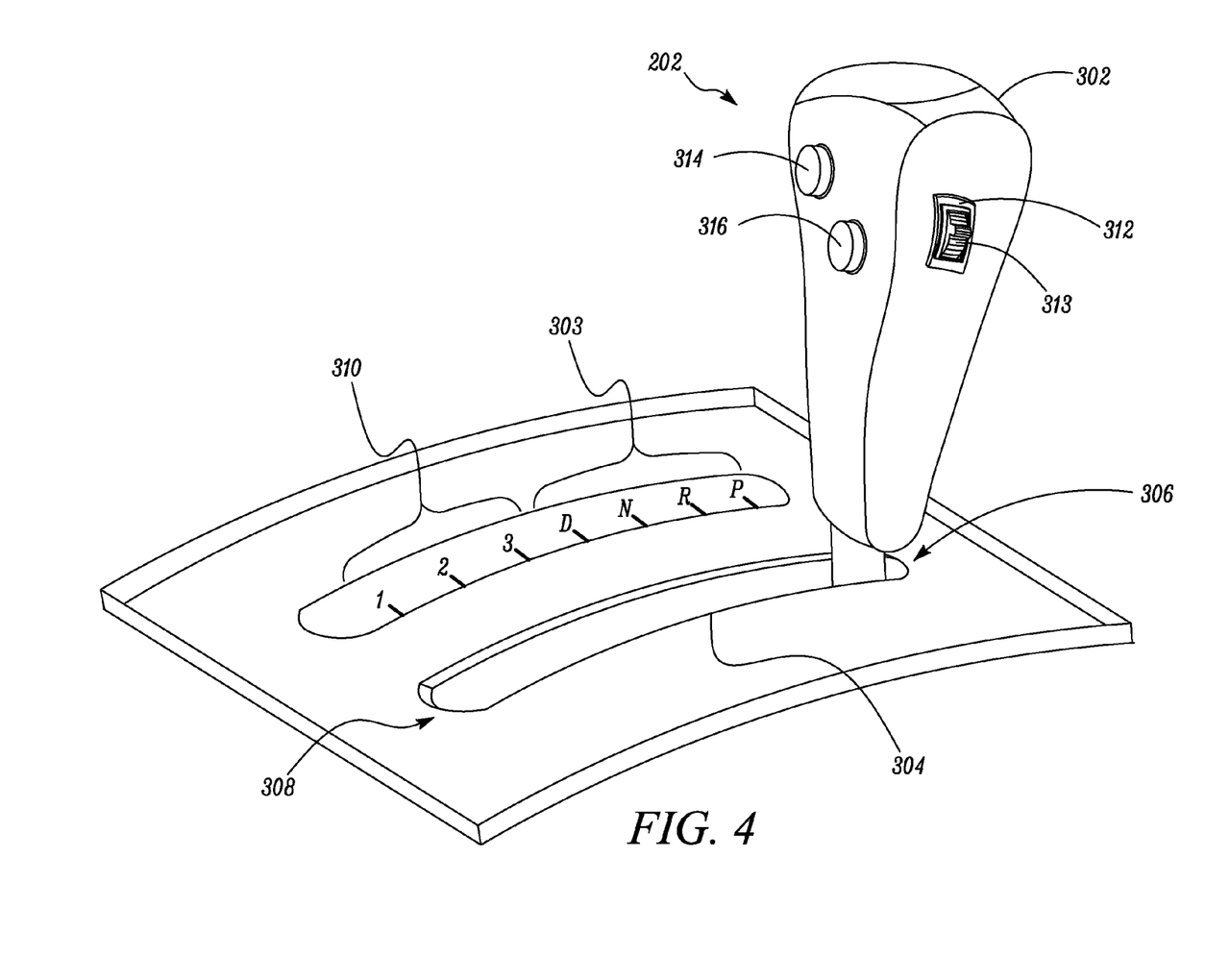
FIG. 4 is a side view of the exemplary input device for the machine.
Figure 5:
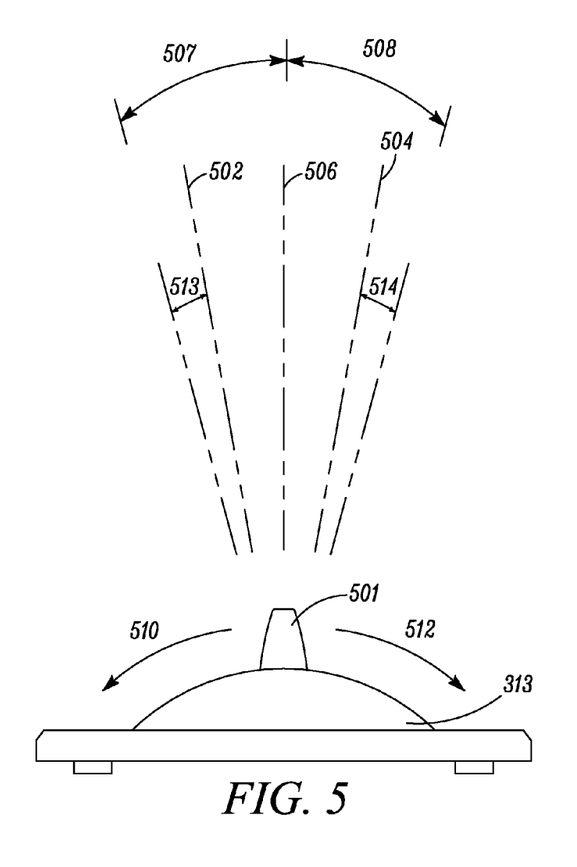
FIG. 5 is a side view illustrating operations of a roller switch disposed on the input device for the machine.

A variety of design options are available for the input device 202. FIGS. 3 and 4 are different views of one such option, according to one embodiment of the present disclosure. In accordance with another embodiment, FIG. 5 is an exploded view of another design option.

Referring to FIGS. 3 and 4, a lever 302 is operable to select from the plurality of transmission modes 303 of the machine 100. As shown in the accompanying figures, the lever 302 may include a joystick. Further, the lever 302 may be disposed within a guiding groove 304, such that the lever 302 is capable of linear movement between a first end stop 306 and a second end stop 308. Based on the position of the lever 302, any one of the transmission modes 303 such as park mode, reverse mode, neutral mode, drive mode and forward mode may be selected.

As will be understood by a person skilled in the art, the park mode is configured to restrict the movement of the machine 100. For example, during a dump cycle the machine 100 may be in the park mode so that while the dump action is being performed, the machine 100 continues to remain stationary. In the reverse mode, a reverse gear of the machine 100 may be engaged to allow the machine 100 to move in the reverse direction. Further, in the neutral mode all gear trains in the transmission control of the machine 100 are disengaged to allow the machine 100 to coast freely under its own weight and gain momentum without the motive force from the engine. Furthermore, in the drive mode the transmission control 208 of the machine 100 is allowed to engage to the complete range of the available forward gear ratios, to further allow the machine 100 to move forward. For example, the drive mode may allow the operator to move in the forward direction and accelerate using a range of gear such as first gear, second gear or third gear in the forward mode for moving the machine 100. The forward mode may allow the operator to accelerate the machine 100 using the appropriate gear transmission setting as desired.

As shown in the accompanying figures, in one embodiment, the forward mode may include a gear range system 310 having a 3-2-1 configuration. Alternatively, the gear range system 310 may be 2-1 gear system. The operator may move and accelerate the machine 100 using the gear range 310. As will be understood by a person skilled in the art, the third gear enables higher acceleration as compared to the first and the second gear system.

Further, a hoisting input device 312 may be disposed on the lever 302, and configured to select from the plurality of hoisting functions associated with the payload carrier 108 of the machine 100. The hoisting functions may include at least one of the raise, lower, hold and float functions. It should be understood that the raising and the lowering functions are associated with the movement of the payload carrier 108 away from or towards the frame 102 of the machine 100 respectively. The hold function is used to retain a current position of the payload carrier 108 between defined limits. The float function is related to holding the payload carrier 108 above a defined limit.

As shown in the illustrated embodiment, the hoisting input device 312 may include a thumb actuated roller switch 313. The roller switch 313 may include detents for enabling the roller switch 313 to be in one of four possible states. A detent is device used to mechanically resist and lock the rotation of the roller switch 313. The detents may define four distinct states of hoisting function. Based on the selected state of the roller switch 313, the payload carrier 108 may be raised, lowered, hold and float. The above described implementation is merely exemplary and does not limit the scope of the present disclosure. The detailed functioning of the roller switch 313 is described in further detail with reference to the following figures.

Further, the lever 302 may optionally include additional control devices disposed on its surface. In one embodiment, a gear selector input device 314 may be disposed on the lever 302. For example, the gear selector input device 314 may include a button. Alternatively, the gear selector input device 314 may include a rocker switch, a rotary switch, or any other device known in the art. The gear selector input device 314 is configured to set a maximum gear of the selected transmission mode 303. For example, a supervisor of the operator may set a specified gear limit and/or speed limit beyond which the machine 100 should not operate. This feature may enhance and ensure safe operation of the machine 100 even during the dump cycle of the machine 100.

Moreover, a gear hold input device 316 may be disposed on the lever 302. The gear hold input device 316 may be a button, a rotary switch, a rocker switch, and the like. The gear hold input device 316 is operable to hold a gear of the selected transmission mode 303. A person of ordinary skill in the art will appreciate that the design of the input device 202 shown in the accompanying figures is exemplary. The input device 202 may additionally include other components not described herein. Moreover, the placement of the buttons and the rocker switch may be so chosen as to allow ease in usage.

Referring now to FIG. 5, the operation of the roller switch 313 is described in accordance with the embodiments of the present disclosure. In one embodiment, the roller switch 313 may include a protrusion 501 for moving the roller switch 313 to select one of the four functions to be executed. Further, the roller switch 313 may include a first detent 502 and a second detent 504 for providing at least four distinct regions for controlling hoisting functions of the machine 100. In one embodiment, the roller switch 313 may have a steady state position 506 at zero degrees. The steady state position 506 of the roller switch 313 may divide the operational range of the roller switch 312 into two distinct regions, the raising region 507 and the lowering region 508, with each region having one detent point. Therefore, the first detent 502 may provide a detent point in the raising region 507 and the second detent 504 may provide a detent point in the lowering region 508.

In one embodiment, the protrusion 501 may be configured to move and indicate the position of the roller switch 313 within the selected operational region and the selected hoisting function. By default, the protrusion 501 points at the steady state position 506 of the roller switch 313. In one embodiment, the roller switch 313 may be moved in a direction shown by arrow head 510 past the first detent 502 i.e., in a first region 513 to raise the payload carrier 108. Further, when the roller switch 313 is released to move behind the first detent 502, then the payload carrier 108 may be put at a hold position. Furthermore, when the roller switch 313 is moved in a direction shown by arrow head 512 and past the second detent 504, i.e., in a second region 514 then the payload carrier 108 may be lowered. Furthermore, when released to move behind the second detent 504, the payload carrier 108 may float at a position. Although only one detent in each of the raising region 507 and the lowering region 508 has been shown for providing four regions for hoisting control functions of the machine 100, it will be understood by a person skilled in the art that the number of detents and the number of regions may be varied.

Figure 6:
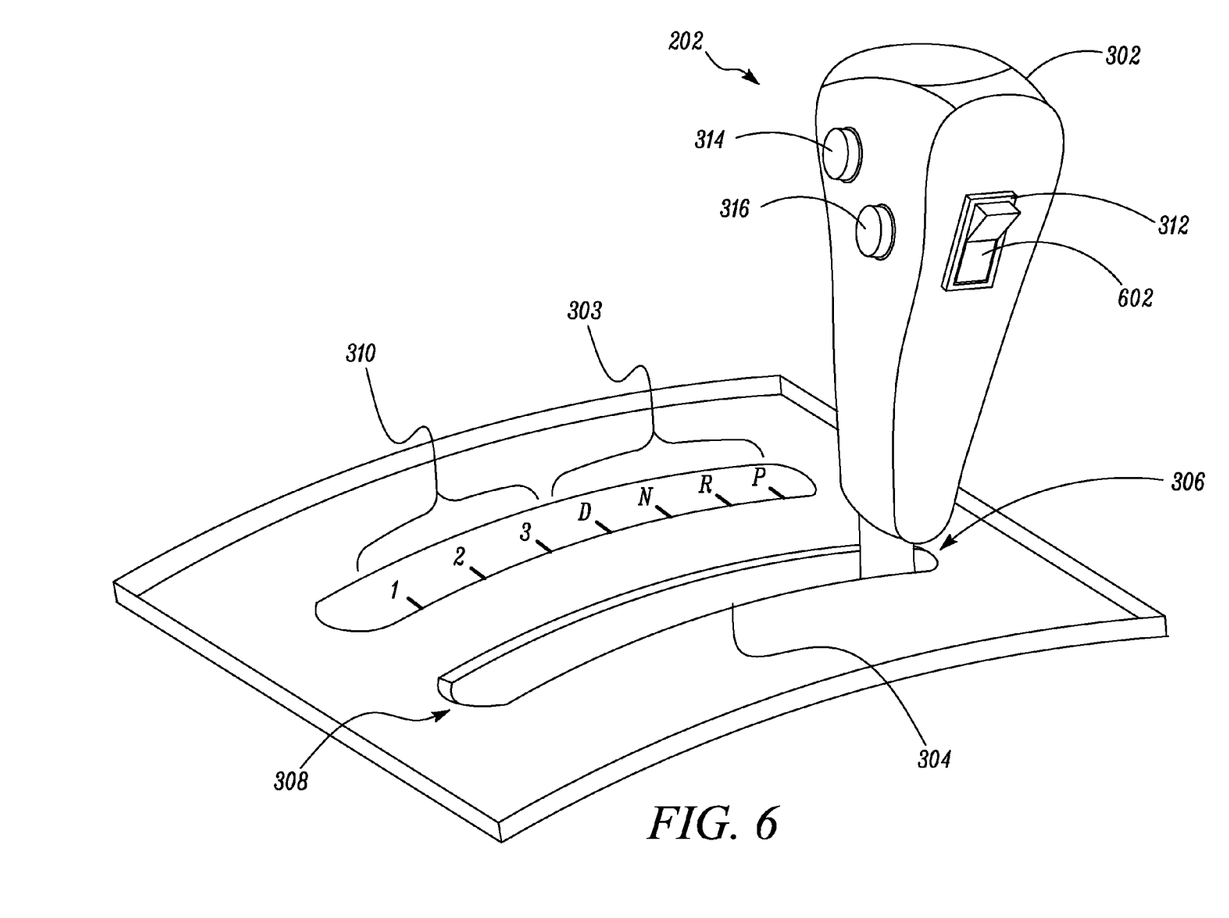
FIG. 6 is the exemplary input device having a rocker switch for hoist control for the machine.

FIG. 6 illustrates another exemplary design of the lever 302. As shown in the accompanying figures, the lever 302 may include a joystick. Further, the lever 302 may be disposed within a guiding groove 304, such that the lever 302 is capable of linear movement between a first end stop 306 and a second end stop 308. Based on the position of the lever 302, any one of the transmission modes 303 such as park mode, reverse mode, neutral mode, drive mode and forward mode may be selected.

As explained previously, a hoisting input device 312 may be disposed on the lever 302, and configured to select from the plurality of hoisting functions associated with the payload carrier 108 of the machine 100. The hoisting functions may include at least one of the raise, lower, hold and float functions. As shown in the illustrated embodiment, the hoisting input device 312 may include a thumb actuated rocker switch 602. Based on an actuation force applied by the operator, the rocker switch 602 may be in any one of four possible states. The four states may correspond to the momentary press and continued press applied to any one of the two ends of the rocker switch 602. For example, when a first end of the rocker switch 602 is pressed momentarily, the lower hoisting function may be selected. On continuous press of the first end, the float function may be selected. Further, when the second end of the rocker switch 602 is pressed momentarily, the raise function may be selected. Continuous pressing of the second end of the rocker switch 602 may cause the hold function to be selected. The above described implementation is merely exemplary and does not limit the scope of the present disclosure.

Figure 7:
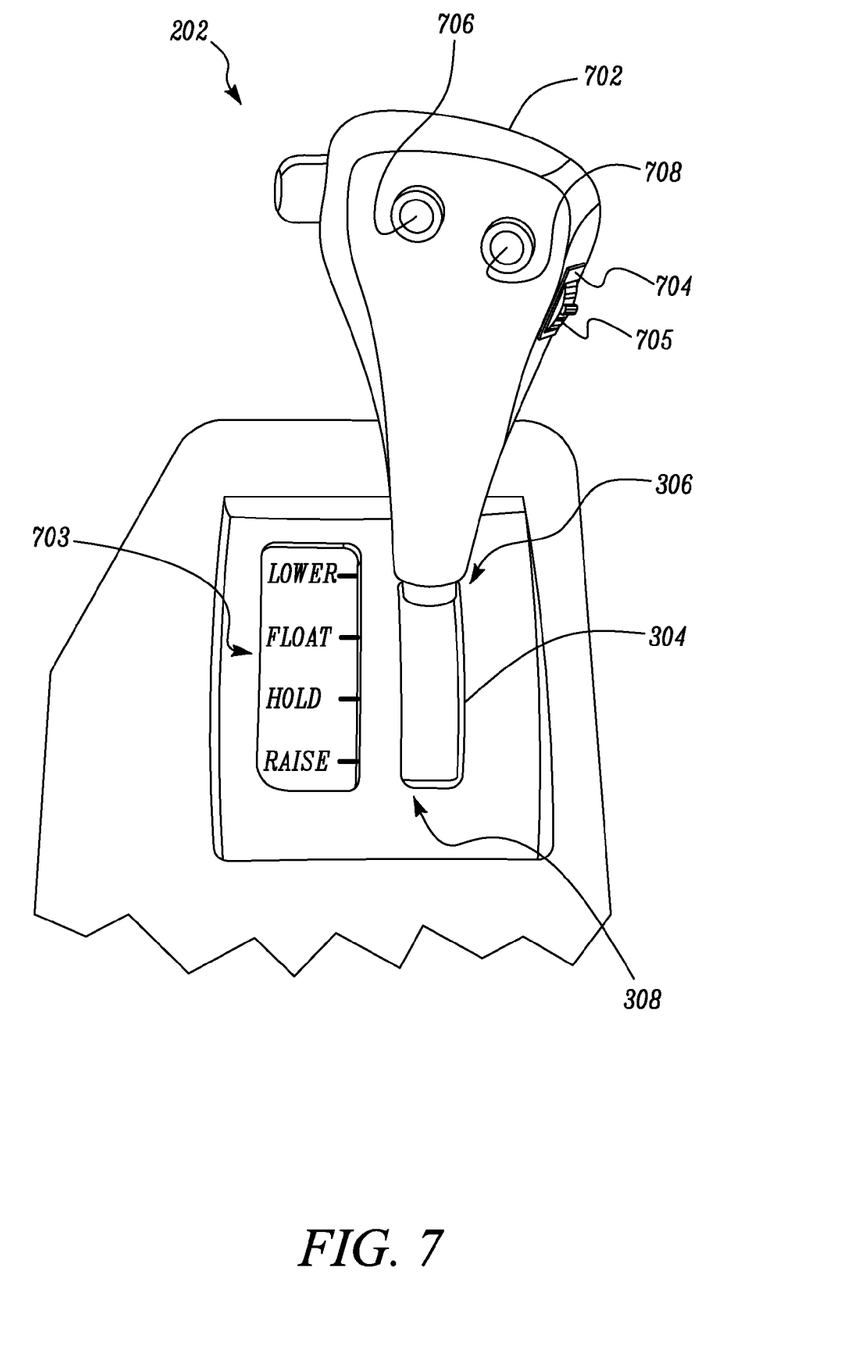
FIG. 7 is another exemplary input device for the machine.

FIG. 7 illustrates another exemplary design of the input device 202. A lever 702 is configured to linearly move within the guided groove 304, between the first end stop 306 and the second end stop 308. Based on the position of the lever 702, any one of the hoisting functions 703 associated with the payload carrier 108 of the machine 100, such as the lower, raise, float or hold functions, may be selected. The lever 702 may be embodied as a joystick as shown. It should be noted that the functionality of the lever 702 of the input device 202 shown in FIG. 7 is different from that of the lever 302 illustrated in FIGS. 3 and 4.

Additionally, a transmission input device 704 may be disposed on the surface of the lever 702. The transmission input device 704 is operable to select from the plurality of transmission modes of the machine 100. In one example, the transmission input device 704 may include a roller switch 705. In one embodiment, the roller switch 705 may include detents to provide distinct states of transmission control such as park mode, reverse mode, neutral mode, drive mode and forward mode. The operator of the machine 100 may select one of these modes in a similar manner as described above for hoisting.

In another embodiment, the input device 704 disposed on the surface of the lever 702 may be a rocker switch. The actuation force applied to a particular end of the rocker switch may determine which transmission mode of the machine 100 is selected. For example when a momentary force is applied to a first end of the rocker switch, the park mode may be selected. The operator may need to apply continuous force to the first end to select the reverse mode. On application of a momentary force on a second end of the rocker switch, the neutral mode may be selected and the continuous force may cause the drive mode to be selected. Alternatively, other devices such as, for example, push buttons may be used as the transmission input device 504.

Other input devices may also be present on the lever 702. As shown in FIG. 7, a transmission upshift input device 706 may be disposed on the lever 702. In the illustrated embodiment, the transmission upshift input device 706 is embodied as a button. The transmission upshift input device 706 is operable to upshift the gear of the selected transmission mode. Also, the lever 702 may include another button as a transmission downshift input device 708. The transmission downshift input device 708 is operable to downshift the gear of the selected transmission mode. For example, the operator may shift the gear up or down as desired for the selected transmission setting by pressing the respective button.

A person of ordinary skill in the art will appreciate that the design of the input device 202 in the FIGS. 3 to 7 are exemplary.

INDUSTRIAL APPLICABILITY

Generally, two separate control levers are used to control the transmission settings and the hoisting of the machine respectively. A first lever may allow the operator to set transmission settings and gear transmission settings for the machine; whereas, a second lever may allow the operator to control a plurality of hoisting functions associated with the payload carrier of the machine. This arrangement may cause space constraints within the cab. Further, the operator may face difficulty in simultaneously operating both these functions of the machine.

To this end, the above disclosed input device 202 enables concurrent controlling of the transmission modes 303 and hoisting functions 703 of the machine 100 without requiring the operator to move his hands from one lever to another. The input device 202 may additionally provide effective and efficient space utilization within the cab 112 of the machine 100. The input device 202 may be used on a variety of machines having the payload carrier 108. Moreover, the design implementations described herein may be suitably modified as per the need of the application. Additional functionality may be added to the input device 202 as per requirement.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An input device for a machine having a payload carrier, the input device comprising:
   a lever disposed within a guiding groove and linearly movable within the guiding groove between discreet locations,; and
   a hoisting input device disposed on the lever, the hoisting input device being selectively movable to one of a multiple states, wherein the lever and the hoisting input device are communicably coupled to a control unit, and
   in response to movement of the lever to one of the discreet locations, a transmission control signal indicative of an operator command for transmission control of one of a plurality of selected transmission modes including at least one of park, reverse, neutral and drive modes is sent to the control unit, and in response movement of the hoisting input device to one of the states, a hoisting control signal indicative of an operator command for hoisting control of a plurality of selected hoisting functions including at least one of lower, float, hold and raise functions associated with a payload carrier of a machine is sent to the control unit.

2. The input device of claim 1 further comprising a gear selector input device disposed on the lever and communicably coupled to the control unit, wherein in response to operation of the gear selector input device, a maximum gear is to be set based on the selected transmission mode.

3. The input device of claim 2 further comprising a gear hold input device disposed on the lever and communicably coupled to the control unit, in response to operation of the gear hold input device, a gear is to be maintained based on the selected transmission mode.

* * * * *